United States Patent
Adams et al.

(10) Patent No.: US 8,495,593 B2
(45) Date of Patent: Jul. 23, 2013

(54) METHOD AND SYSTEM FOR STATE MACHINE TRANSLATION

(75) Inventors: Gregory D Adams, Dunrobin (CA); Jonathan David Bennett, Markham (CA); Perry Randolph Giffen, Kemptville (CA); Axel Martens, White Plains, NY (US); William Gerald O'Farrell, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1267 days.

(21) Appl. No.: 12/065,105

(22) PCT Filed: Sep. 9, 2005

(86) PCT No.: PCT/CA2005/001379
§ 371 (c)(1),
(2), (4) Date: Feb. 28, 2008

(87) PCT Pub. No.: WO2007/028226
PCT Pub. Date: Mar. 15, 2007

(65) Prior Publication Data
US 2008/0263524 A1  Oct. 23, 2008

(51) Int. Cl.
*G06F 9/44* (2006.01)
*G06F 9/45* (2006.01)

(52) U.S. Cl.
USPC .......................... 717/136; 717/141; 717/144

(58) Field of Classification Search
USPC .................................. 717/124–131, 136–144
See application file for complete search history.

(56) References Cited

U.S. PATENT DOCUMENTS

| | | | | |
|---|---|---|---|---|
| 5,163,016 A | * | 11/1992 | Har'El et al. | 716/102 |
| 5,263,162 A | * | 11/1993 | Lundeby | 717/143 |
| 5,363,099 A | | 11/1994 | Allen | |
| 5,367,609 A | | 11/1994 | Hopper et al. | |
| 5,369,577 A | * | 11/1994 | Kadashevich et al. | 704/9 |
| 5,481,717 A | * | 1/1996 | Gaboury | 717/126 |
| 5,812,850 A | * | 9/1998 | Wimble | 717/131 |
| 5,937,193 A | | 8/1999 | Evoy | |
| 5,954,830 A | | 9/1999 | Ternullo, Jr. | |
| 6,091,897 A | * | 7/2000 | Yates et al. | 717/138 |
| 6,131,189 A | * | 10/2000 | Chow et al. | 717/141 |
| 6,212,625 B1 | | 4/2001 | Russell | |
| 6,226,789 B1 | * | 5/2001 | Tye et al. | 717/138 |
| 6,308,147 B1 | | 10/2001 | Keaveny | |
| 6,343,372 B1 | * | 1/2002 | Felty et al. | 717/136 |

(Continued)

OTHER PUBLICATIONS

Sun et al, "Meta structure transformation model for statistical machine translation", ACM, pp. 64-71, 2007.*

(Continued)

*Primary Examiner* — Anil Khatri
(74) *Attorney, Agent, or Firm* — Jordan IP Law, LLC (57) ABSTRACT

A state machine program is generated from a state machine. The state machine has states, transitions and events. A basic structure for the state machine program is generated. The basic structure has therein a structure that operates in non-final states. A statement is generated within the structure for detecting an event. A statement is generated within the structure for evaluating the detected event based on a current state to identify if the current state is valid for the detected event. A statement is generated within the structure for determining a next state if the current state is valid. A statement is generated within the structure for transitioning the current state to the next state.

49 Claims, 7 Drawing Sheets

U.S. PATENT DOCUMENTS

| | | | |
|---|---|---|---|
| 6,477,439 B1 | 11/2002 | Bernaden, III et al. | |
| 6,499,136 B1 * | 12/2002 | Dempsey et al. | 717/127 |
| 6,505,342 B1 * | 1/2003 | Hartmann et al. | 717/104 |
| 6,578,197 B1 * | 6/2003 | Peercy et al. | 717/143 |
| 6,665,725 B1 * | 12/2003 | Dietz et al. | 709/230 |
| 6,698,012 B1 * | 2/2004 | Kossatchev et al. | 717/126 |
| 6,772,413 B2 * | 8/2004 | Kuznetsov | 717/136 |
| 7,010,784 B1 * | 3/2006 | Sentovich et al. | 717/140 |
| 7,013,456 B1 * | 3/2006 | Van Dyke et al. | 717/130 |
| 7,024,660 B2 * | 4/2006 | Andrade et al. | 717/124 |
| 7,219,340 B2 * | 5/2007 | Schechter et al. | 717/144 |
| 7,254,806 B1 * | 8/2007 | Yates et al. | 717/136 |
| 7,340,728 B2 * | 3/2008 | Kutter | 717/139 |
| 7,496,895 B1 * | 2/2009 | Mosterman et al. | 717/124 |
| 7,607,130 B2 * | 10/2009 | Singh et al. | 718/100 |
| 7,657,877 B2 * | 2/2010 | Vorbach et al. | 717/141 |
| 7,730,498 B2 * | 6/2010 | Resnick et al. | 719/328 |
| 7,779,394 B2 * | 8/2010 | Homing et al. | 717/136 |
| 7,802,238 B2 * | 9/2010 | Clinton | 717/136 |
| 7,992,134 B2 * | 8/2011 | Hinchey et al. | 717/126 |
| 8,099,722 B2 * | 1/2012 | Fairweather | 717/143 |
| 8,196,109 B2 * | 6/2012 | Fung et al. | 717/125 |
| 8,307,347 B2 * | 11/2012 | Austin et al. | 717/131 |
| 2005/0050308 A1 | 3/2005 | Zatloukal et al. | |

OTHER PUBLICATIONS

Wang et al, "Re-structuring, re-labeling and re-aligning or syntax based machine translation", ACM, vol. 36, No. 2, pp. 247-277, 2010.*

Habibi et al, "Design for verification of systemC transaction level models", IEEE Date, pp. 1-6, 2005.*

Calaco et al, "A conservative extension of synchronous data flow with state machine", ACM EMSOFT, pp. 173-182, 2005.*

Kath, O., Towards executable models: transforming EDOC behavior models to Cobra & BPEL—AN-8314565, 2004 Inspec.

Betin-Can et al., Design for Verification for Asynchronously Communicating Web Services, 2005, ACM Digital Library.

Fu, X et al., Model Checking XML Manipulating Software, 2004, ACM Digital Library.

Hall, RJ et al., Model Interchange and Integration for Web Services, 2004, ACM Digital Library.

Nanda, MG. et al., Decentralizing Execution of Composite Web Services, 2004, ACM Ditigal Library.

* cited by examiner

METHOD AND SYSTEM FOR STATE MACHINE TRANSLATION

FIELD OF THE INVENTION

The present invention is relates to translating state machines into an executable format useable in a computer.

BACKGROUND OF THE INVENTION

State machines can be a valuable component in a broad range of business applications. Typically, state machines are translated into an executable program using a procedural language. A state machine program in a procedural language is useful for simple applications. However, as a result of the complexity of business applications, state machines are often realized in the Unified Modeling Language (UML) to enable business application modeling.

State machines that are employed in business applications confront situations that are not issues in simpler environments. In a business application there may be many simultaneous instances of a state machine, thus ensuring that incoming events are directed to the appropriate state machine instance is not simple. Given the context of multi-protocol service-based architectures in which business application state machines exist, flexible interfaces therein are useful for facilitating an implementation that can quickly respond to changes in the performance characteristics and constraints of the business application. Further, in a business application there are timeout and alarm conditions that should be taken into account by the state machine program.

SUMMARY OF THE INVENTION

In accordance with one embodiment there is provided a method of translating a state machine into a state machine program comprising: identifying relationships between states, transitions and events in the state machine; generating a state machine program having a structure that operates in non-final states; and generating statements within the structure for detecting an event, evaluating the detected event based on a current state to identify if the current state is valid for the detected event, and determining a next state if the current state is valid.

In accordance with another embodiment there is provided a method of translating a state machine into a state machine program comprising: identifying relationships between states, transitions and events in the state machine; generating a state machine program having a structure that operates in non-final states; and wherein during execution the structure performs the functions of detecting an event, evaluating the detected event based on a current state to identify if the current state is valid for the detected event, and transitioning the current state to the next state.

In accordance with another embodiment there is provided a method of generating a state machine program from a state machine, the state machine having states, transitions and events, said method comprising: generating a basic structure for the state machine program, the basic structure having therein a structure that operates in non-final states; generating a statement within the structure for detecting an event; generating a statement within the structure for evaluating the detected event based on a current state to identify if the current state is valid for the detected event; generating a statement within the structure for determining a next state if the current state is valid; and generating a statement within the structure for transitioning the current state to the next state.

In accordance with another embodiment there is provided a system for translating a state machine into a state machine program comprising: a lexical analyzer for determining states and transitions in the state machine; a parser for determining relationships between events and the determined states and transitions; and a program generator for generating a state machine program, said program generator comprising: a state process component for generating a structure in the state machine program that operates in non-final states, said state process component comprising: an events component for generating a statement within the structure for detecting an event; an event determination component for generating a statement within the structure for evaluating the detected event based on a current state to identify if the current state is valid for the detected event; and a transition component for generating a statement within the structure for determining a next state if the current state is valid.

In accordance with another embodiment there is provided a computer readable medium having stored thereon computer-executable instructions for translating a state machine into a state machine program, the computer-executable instructions implementing the steps comprising: identifying relationships between states, transitions and events in the state machine; generating a state machine program having a structure that operates in non-final states; and generating statements within the structure for detecting an event, evaluating the detected event based on a current state to identify if the current state is valid for the detected event, and determining a next state if the current state is valid.

In accordance with another embodiment there is provided a computer readable medium having stored thereon computer-executable instructions for translating a state machine into a state machine program the computer-executable instructions implementing the steps comprising: identifying relationships between states, transitions and events in the state machine; generating a state machine program having a structure that operates in non-final states; and wherein during execution the structure performs the functions of detecting an event, evaluating the detected event based on a current state to identify if the current state is valid for the detected event, and transitioning the current state to the next state.

In accordance with another embodiment there is provided a computer readable medium having stored thereon computer-executable instructions for generating a state machine program from a state machine, the state machine having states, transitions and events, the computer-executable instructions implementing the steps comprising: generating a basic structure for the state machine program, the basic structure having therein a structure that operates in non-final states; generating a statement within the structure for detecting an event; generating a statement within the structure for evaluating the detected event based on a current state to identify if the current state is valid for the detected event; generating a statement within the structure for determining a next state if the current state is valid; and generating a statement within the structure for transitioning the current state to the next state.

A state machine program is generated from a state machine in accordance with the invention, and may be provided in the form of computer-executable instructions embodied in a computer useable medium. The state machine has states, transitions and events. A basic structure for the state machine program is generated. The basic structure has therein a structure that operates in non-final states. A statement is generated within the structure for detecting an event. A statement is generated within the structure for evaluating the detected event based on a current state to identify if the current state is valid for the detected event. A statement is generated within the structure for determining a next state if the current state is valid. A statement is generated within the structure for transitioning the current state to the next state.

DETAILED DESCRIPTION

Figure 1:
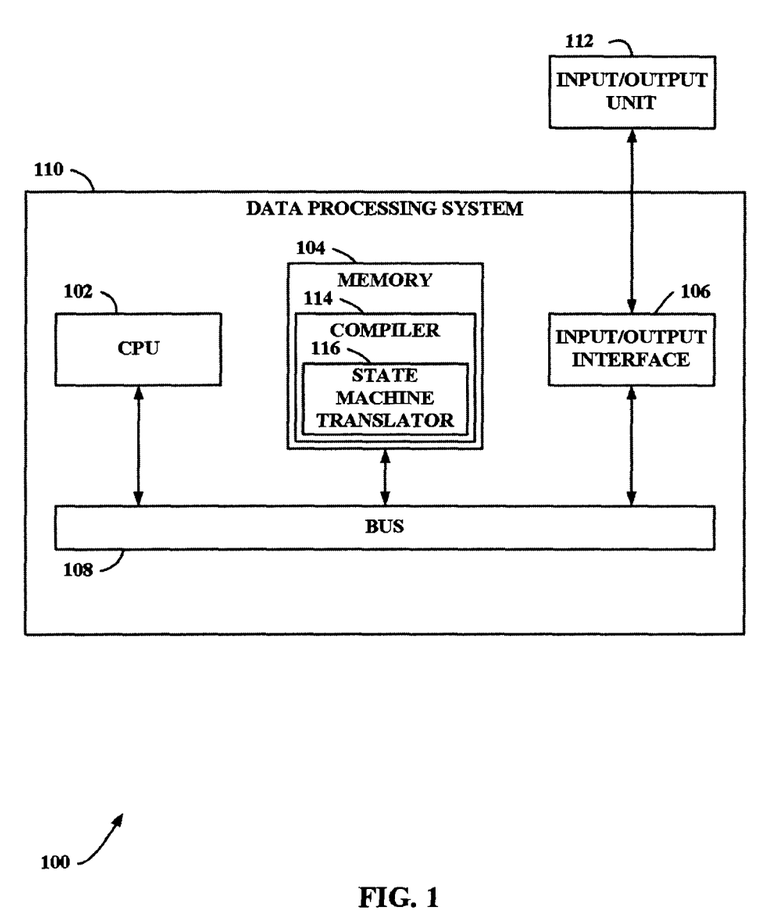
FIG. 1 illustrates a computer system with which an embodiment of a system for state machine translation may be associated.

FIG. 1 illustrates a configuration of a computer system 100 with which an embodiment of a system for state machine translation may be associated.

The computer system 100 includes a data processing system 110 with a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112.

The memory 104 may contain a compiler 114 with a state machine translator 116. Alternatively, the state machine translator 116, and possibly the compiler 114 may be recorded on any type of recording medium such as a magnetic disk or an optical disk. The state machine translator 116 recorded on such a recording medium is loaded to the memory 104 of the data processing system 110 via the input/output unit 112 (e.g. a disk drive).

The CPU 102 can be a commercially available CPU or a customized CPU suitable for operations described herein. Other variations of CPU 102 can include a plurality of CPUs interconnected to coordinate various operations and functions. The CPU 102 contains resources for the execution of the compiler 114 and the state machine translator 116. The data processing system 110 serves as an apparatus for performing a method of translating state machines by the CPU 102 executing such a method.

FIGS. 2 to 5A and 5B describe a method for translating state machines into an executable program that implements the state machine. In a business application environment the conditions in which the state machine will be executed may be very demanding and complex. The programming language used for the implementation of the state machine program should be able to accommodate for these conditions by enabling multiple simultaneous instances of the state machine, providing flexible interfaces with external components and supporting alarms and timers. One such language by which the state machine may be translated to accommodate for the above characteristics is the Business Process Execution Language (BPEL). BPEL describes a business process as activities that define activity behaviors, including the ability to invoke services, control flow and compensate when errors occur. BPEL further enables multiple instances of a state machine program. Each instance may have associated therewith correlation information used to direct incoming messages to the correct state machine instance.

In general, the state machine has states linked by transitions which are invoked by events, where the events may be operations on external interfaces of the state machine or messages received by the state machine. Composite states composed of multiple states may be present in the state machine. Such composite states enable a small state machine to be represented as a single state in the larger state machine.

The state machine that is translated by the methods in FIGS. 2 to 5A and 5B may be in any known form, for example Unified Modeling Language (UML), State Machine Composition Language (SACL), etc. For the purposes of the exemplary embodiment described herein, the state machines will be considered to be expressed in State Machine Composition Language (SACL).

The state machine expressed in SACL has an initial state in which each state machine instance starts when the instance is created, and zero or more final states that cause the state machine instance to terminate. Each state in the state machine may have optional actions that are performed on entry into the state and actions that are performed when the state is exited. Each transition from one state into another in the state machine may be guarded to ensure that the current state can be left and the next state can be entered given any relevant operating conditions.

Figure 2:
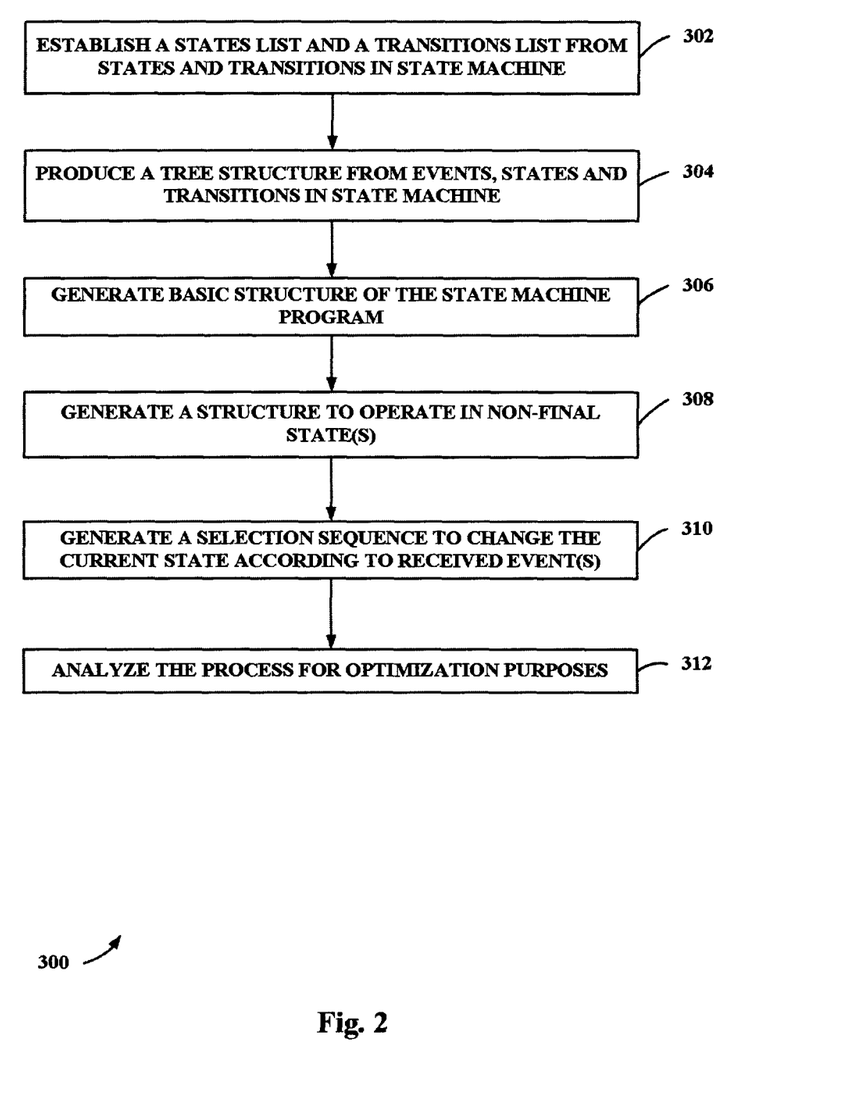
FIG. 2 shows a flow diagram illustrating a method of translating state machines.

FIG. 2 is a flow illustrating an overview of a method 300 of translating a state machine into a state machine program in BPEL. The state machine used at the beginning of the translation method 300 is a description of a state machine in a known language, such as UML or SACL. The translation method 300 results in an executable program that implements the state machine. Although the end result is termed an executable 'program' throughout the description, this refers to both the case where the state machine program is a standalone program and also the case where the state machine program is a module in a larger program. Thus, the use of the expression 'program' is not meant to limit the results of the method 300 to any form other than some component that is capable of being executed.

A states list and a transitions list containing all of the states and transitions in the state machine are established in step 302. Step 302 can generally be described as lexical analysis and is described in further detail in FIG. 3.

A tree structure is created by mapping the events in the state machine with the states in the states list and the transitions in the transitions list in step 304. Step 304 can generally be described as parsing and is described in further detail in FIG. 4.

A basic structure for the state machine program is generated in step 306. This basic structure may include initializing of variables as well as setting an initial state. In step 308 a structure is generated in the basic structure to perform the functionality of the state machine as long as the current state is not a final state. The structure generated in step 308 may be a loop that contains the functionality of the state machine and continues to iterate until just before or just after the current state is to be changed into one of the final states. In step 310 a selection sequence is generated inside the structure from step 308 to change the current state according to received events. The selection sequence waits for an event received, deciphers the type of event and based on this information in combination with the current state, determines the next state. The end result of steps 306 to 310 is the generation of the state machine program. Steps 306 to 310 can generally be described as program generation and are described in further detail in FIGS. 5A and 5B.

The state machine program is analyzed in step 312 for optimization purposes. The state machine program may be modified in any of a number of known ways to enhance execution thereof. For example, various statements that are related may be grouped together.

Figure 3:
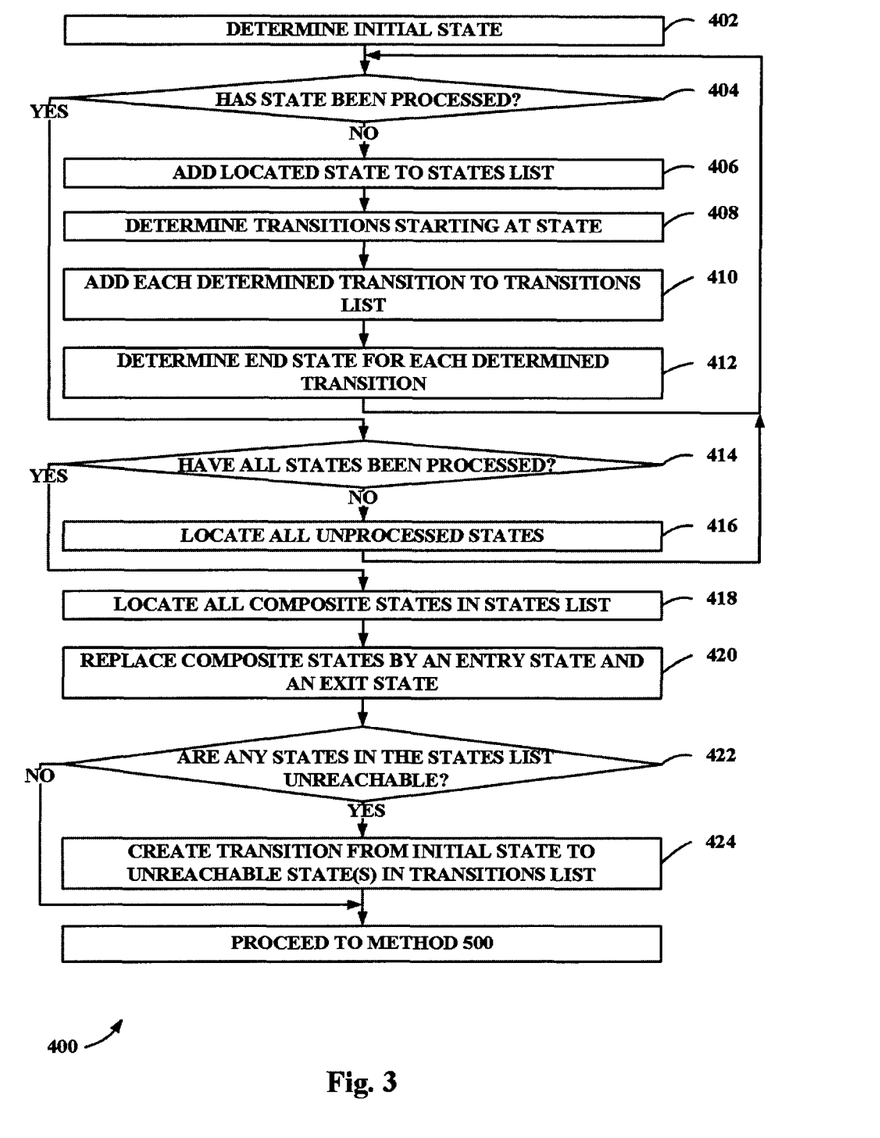
FIG. 3 shows a flow diagram illustrating a lexical analysis method from FIG. 2.

FIG. 3 is a flow diagram illustrating a lexical analysis method 400 as identified in step 302 of FIG. 2.

An initial state is determined from the state machine in step 402. The initial state is the state in which each instance of the state machine will start.

Steps 404 to 416 locate the states and transitions in the state machine. The states and any information directly associated with the states are added to the states list. The transitions and any information directly associated with the transitions are added to the transitions list.

Step 404 determines if the state has been processed. If this is the first time that step 404 is encountered then the state in question will be the initial state, otherwise the state in question will be those states that were determined in step 412 prior to repeating step 404. The states list provides an indication of whether or not the state has been processed. If the state is not present in the states list then this indicates that the state has not been processed. Alternatively, a separate list containing the processed states may be created and each state may be added thereto when they are added to the states list. The state is added to the states list in step 406. When the state is added to the states list any information relating to the state is also added thereto. Such additional information may include any entry and exit actions associated with the state. The states list may also include an indication of all transitions that lead to and from the state.

The transitions that start at the state are determined in step 408. These transitions are added to the transitions list in step 410. As with the states, when the transition is added to the transitions list any information relating to the transition is also added to the transitions list. For the transitions, such additional information may include any information that is to be sent to a user of the state machine program when the transition is listed as being the next transition into the next state. The transitions list may also contain the start and end state for each transition. A transition may be initiated by an event that is detected by the state machine or it may be automatic. That is, a state may be entered for a fixed amount of time and then the state may be automatically changed, or an action may be performed when the state machine enters a state and afterwards the transition out of the state is automatic.

The end state for each transition added to the transitions list is determined in step 412. Steps 404 to 412 are then repeated for each end state for each transition added to the transitions list.

If the state has already been processed then step 414 determines if there are any remaining states in the state machine that have not been processed. Since the states that have already been added to the states list have been located through their associated transitions, any remaining states may be unreachable states. If there are remaining states that have not been processed then these states are located in step 416 and steps 404 to 412 are repeated with these located states.

When all states have been processed, the composite states in the states list are located in step 418. These composite states are replaced by two separate states in the states list in step 420. The two states that replace the composite states are an entry state and an exit state.

Step 422 determines if there are any unreachable states in the states list. For any states that are unreachable, a transition from the initial state to the unreachable state is created in the transitions list in step 424.

Figure 4:
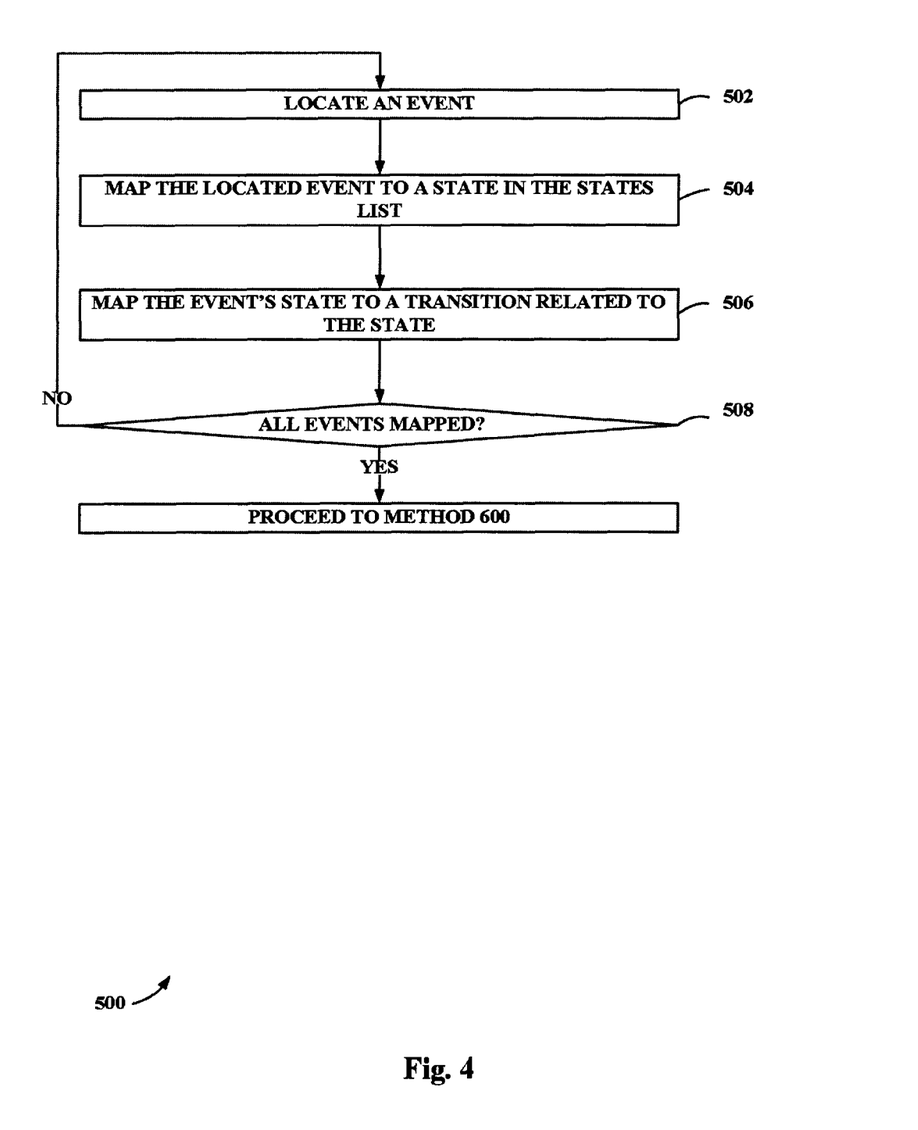
FIG. 4 shows a flow diagram illustrating a parsing method from FIG. 2.

After all unreachable states have been processed then method 500 in FIG. 4 is performed.

FIG. 4 is a flow diagram illustrating the parsing method 500 as identified in step 304 of FIG. 2. The method 500 creates a tree structure representing the relationships between events and the states in the states list and the transitions in the transitions list.

An event is located in step 502. This event is mapped to a state in the states list in step 504 that is associated with the event. This associated state is used in step 506 to determine a related transition from the transitions list. This creates a map between the events, states and transitions. In step 508 it is determined if all events have been mapped. If there are remaining events to be mapped then steps 502 to 508 are repeated until all events have been mapped to states and transitions. As a result of mapping the events to the states and transitions, the tree structure is formed.

Figure 5A:
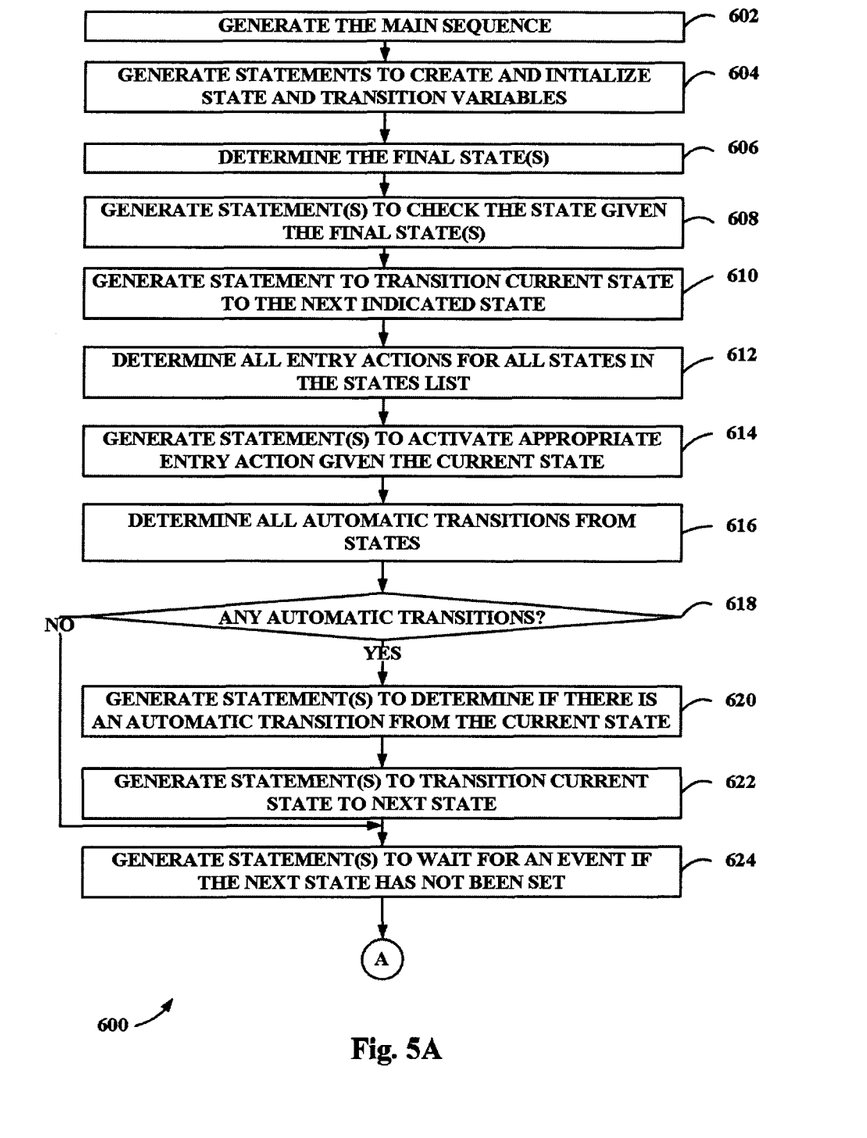
FIGS. 5A and 5B show flow diagrams illustrating a method of generating a state machine program from FIG. 2.
Figure 5B:
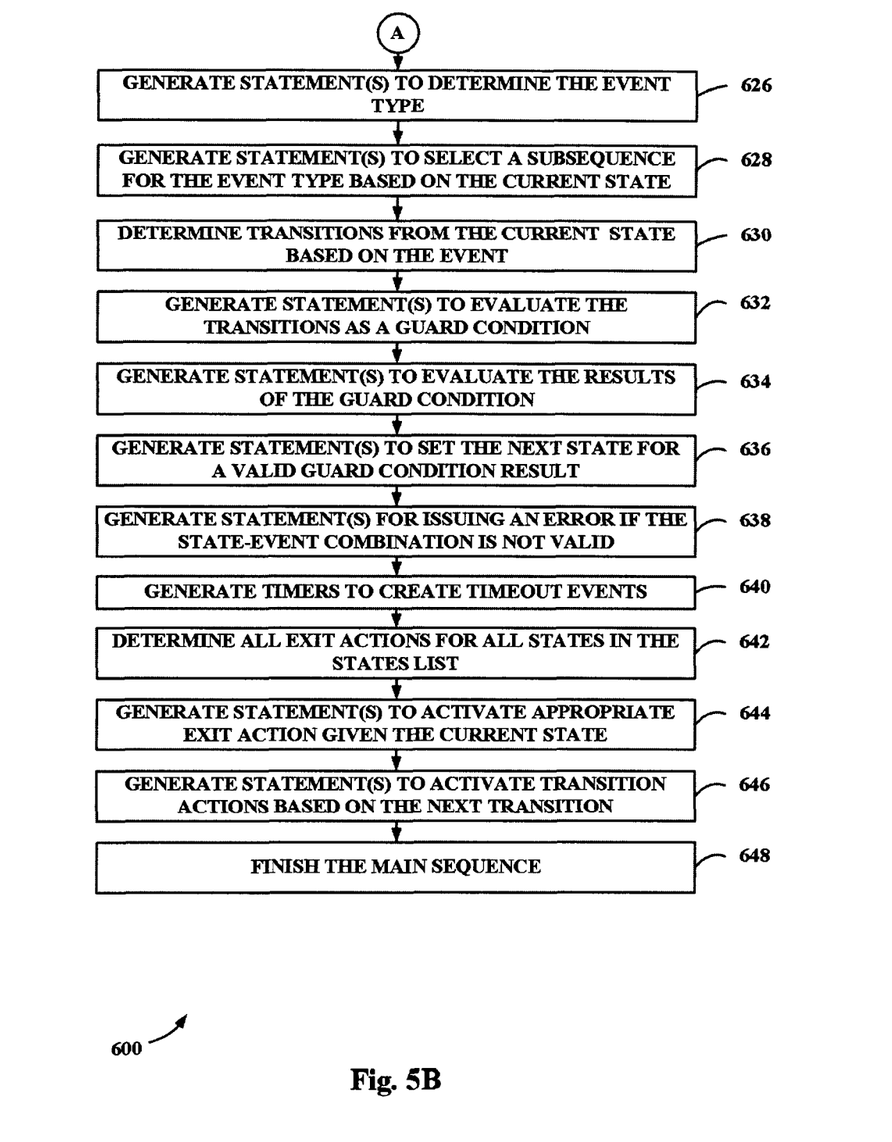

After all events have been mapped to states and transitions then method 600 in FIGS. 5A and 5B is performed.

FIGS. 5A and 5B are flow diagrams illustrating the method 600 of generating the state machine program from the states list and transitions list created by the method 400 as well as the tree structure created by the method 500. The method 600 encompasses steps 306 to 310 of the method 300 from FIG. 2.

Steps 602 and 604 generate a basic structure for the state machine program as identified in step 306 of FIG. 2. A main sequence is generated in step 602. This main sequence includes standard syntax for starting and finishing an executable program in BPEL and may be very similar, if not identical, for every state machine program. Statements for the creation and initialization of variables representing states and transitions are added to the main sequence in step 604. The state is set to the initial state of the state machine in this initialization sequence and the next state is set to the state immediately following the initial state.

Steps 606 to 610 generate a structure in the basic structure to perform the functionality of the state machine for all non-final states as identified in step 308 of FIG. 2.

The final states are determined in step 606 by examining the states list. Statement(s) are generated in step 608 to check that the next state is not the final state(s). The functionality of the state machine is provided after this check and operates only while the next state is not one of the final states. If the next state is one of the final states then the functionality of the state machine is not activated and the main sequence terminates. The check for the final state(s) may be in the form of a loop that continues to operate as long as the next state is not one of the final state(s) for the case where the current state is transitioned at the beginning of the loop. If the current state is transitioned at the end of the loop then the loop continues to operate as long as the state is not one of the final state(s).

Steps 610 to 646 generate a selection sequence to change the current state according to received event(s) as identified in step 310 of FIG. 2. Steps 624 to 638 generate statements that wait for, receive and process event(s) to determine the next state.

The functionality of the state machine may be provided in an iterative form such that different paths within this iterative form are taken for each state. Thus, the sequence for each state has the same general structure (since it may be the same general statements that are executed) but each statement in the structure may be activated (or inactivated) depending on the state. Since each statement may be activated or inactivated depending on the state, this provides a different path through the iterative form for each state. Steps 610 to 638 describe the process by which the iterative form of the functionality of the state machine is produced.

A statement to transition the current state to the next indicated state is generated in step 610. In this form the state change occurs at the beginning of an iteration; however, the state change may alternatively occur at the end of the iteration. In a case where the transition occurs at the end of the iteration, the check generated in step 608 may check that the current state is not a final state, as opposed to checking that the next state is not a final state.

The states list is examined in step 612 to determine all entry actions for all states therein. The states that have entry actions are identified and those entry actions are extracted from the states list. Statement(s) are generated in step 614 to activate an appropriate entry action given the current state. This may be accomplished by using a statement to switch control flow towards the appropriate entry action given the current state. Alternatively, the entry actions for each individual state may be appropriately named so that a variable holding the current state name will cause the entry action for the current state to be executed.

The transitions list and the states list are examined in step 616 to determine if there are any automatic transitions in the state machine. Automatic transitions may be indicated by the lack of an event associated with a transition or a state. If there are automatic transitions that are located, as determined in step 618, then statement(s) determining if there is an automatic transition from the current state are generated in step 620. In step 622 statement(s) to set the next state are generated if there is an automatic transition from the current state.

If there were no automatic transitions in the state machine, as determined in step 618, or after statement(s) for the automatic transitions have been generated, statements are generated in step 624 to wait for an event if the next state has not been set. If the next state has already been set, such as by an automatic transition, then the steps of waiting for an event, checking the event and changing the state are not performed; thus, processing of the state enters the final steps, which are generated in 644 and 646. To keep the process waiting for an event, and avoid the waiting process if the next state has been determined, the steps of waiting for an event, checking the event and changing the state may be preceded by statement(s) that check if the next state has been determined. Such statements may be in the form of a loop that continues to operate as long as the next state has not been determined. Steps 624 to 638 may be incorporated as long as the next state has not been determined. Steps 624 to 638 may be incorporated within such a loop.

Statement(s) to determine the event type are generated in step 626. Timeouts may be treated as a type of event. Thus, the handling of a timeout may have the same structure as the handling of an input or other event.

Step 628 generates statement(s) to select a subsequence based on the current state. Based on the subsequences, the current state may be changed, nothing might happen or an error may be issued. The subsequences may be generated for each valid state-event combination. A valid state-event combination is one in which the state may be changed given the event or the event can be expected to be received in the state. All invalid state-event combinations are handled by a separate subsequence. Thus, between steps 626 and 628, the process waits for an event and then determines a subsequence to transition the state based on the current state. Alternatively, the current state could be determined first and then the process could wait for an event that is valid for the current state. In this alternative the manner in which invalid events are handled is important since the process waits for a valid event for the current state rather than waiting for the event and then determining the current state. Thus, if events that are not valid for the current state (but which would otherwise be valid) are queued, then this error between the current state and the event may not be brought to the attention of a user.

The transitions from the different states based on the event are determined in step 630. These transitions are used in step 632 to generate statements to evaluate the transitions as a guard condition.

Statements to evaluate the results of the guard condition are generated in step 634. Based on the results of the guard condition the state may or may not be switched. Multiple case sections are generated with statements. Each of these case sections has an associated condition corresponding to a guard condition which, if evaluated to be true during execution, results in the transition being invoked and the next state being set. In step 636 statements for setting the next state are generated for the case where the guard condition result is valid. One of the case sections may be developed to handle the situation where one of the other case sections is evaluated as true. In such a final case section no transition is invoked and the next state is not set. As a result waiting for another event continues.

To handle the case when the state-event combination is not valid then statements are created to issue a fault in step 638. After step 638 is finished, the subsequence of waiting for an event to change the state is completed.

Timers are generated in step 640. These timers are used to time various response times and actions in the state machines. The outputs of these timers are events.

The states list is examined in step 642 to determine all exit actions for all states therein. The states that have exit actions are identified and those exit actions are extracted. Statement(s) are generated in step 644 to active an appropriate exit action given the current state. The manner in which the exit actions are activated is similar to that for the entry actions.

In state 646 statements to activate transition actions are generated based on the next transition. As with the entry and exit actions, the transition actions are activated according to the next transition.

In step 648 the main sequence is completed.

The steps in the method 600 were described in the order shown merely for convenience of explanation. While the main sequence should be generated prior to the other statements, such other statements may be generated in any order. The method 600 should not be limited to the order shown in the FIGS. 5A and 5B.

Figure 6:
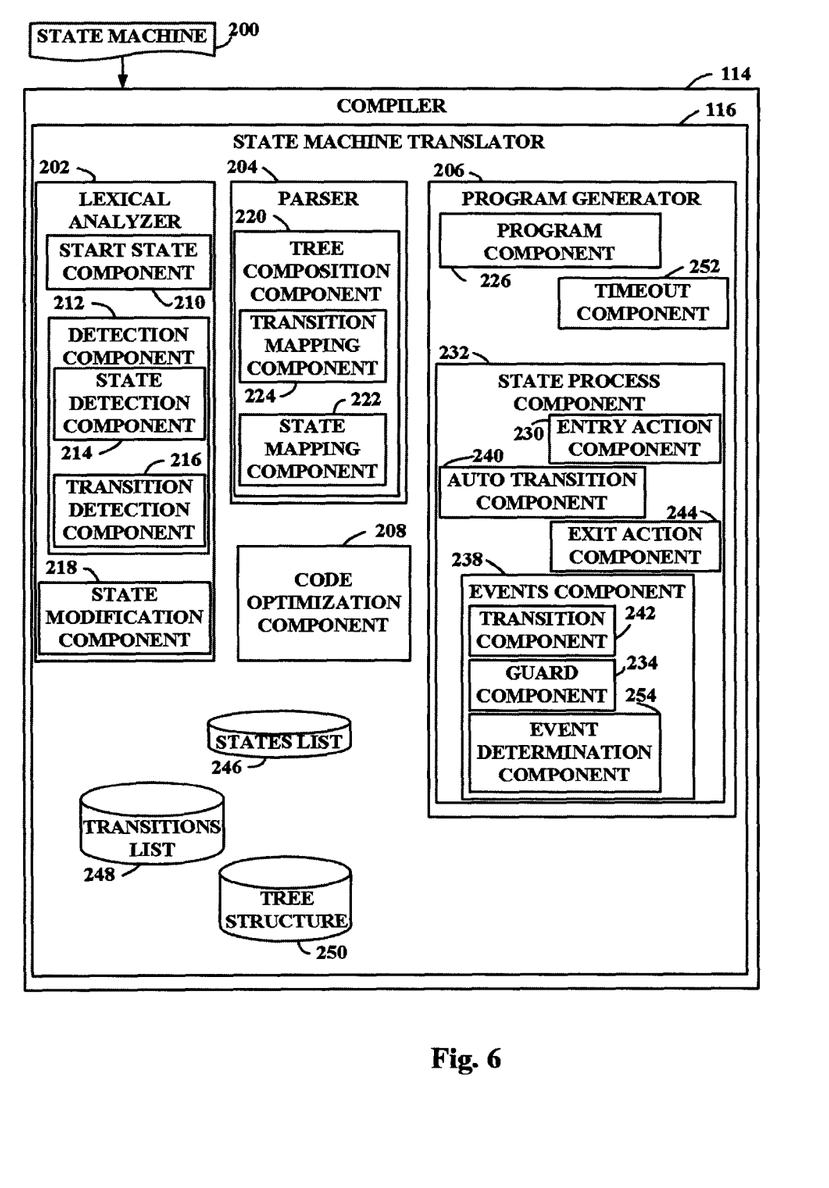
FIG. 6 illustrates a system for state machine translation.

FIG. 6 illustrates the functional components of the state machine translator 116. The state machine translator 116 as shown in FIG. 6 receives a description of a state machine 200 and translates this description into a state machine program.

The state machine translator 116 has a lexical analyzer 202, a parser 204, a program generator 206 and a code optimization component 208, all of which process the state machine 200 for translation purposes. The state machine translator 116 also includes a states list 246, a transitions list 248 and a tree structure 250, all of which hold information about the state machine 200 that is derived from and used by the lexical analyzer 202, the parser 204, the model generator 206 and the code optimization component 208. Processing of the state machine 200 progresses from the lexical analyzer 202, to the parser 204, then the model generator 206 and finally the code optimization component 208.

The state machine 200 is received by the lexical analyzer 202. The state machine 200 received by the lexical analyzer 202 is a description of a state machine in a known language. The lexical analyzer 202 is composed of a start state component 210, a detection component 212 and a state modification component 218. The lexical analyzer implements the method 300 shown in FIG. 2. The start state component 210, the detection component 212 and the state modification component 218 determine the states and the transitions in the state machine 200 and populate the states list 246 and the transitions list 248 using this information.

The start state component 210 determines the initial state of the state machine 200. This initial state is inserted in the states list 246 by the start state component 246. Once the initial state has been determined the detection component 212 is able to progress through the state machine 200 to determine the remaining states and transitions.

A state detection component 214 and a transition detection component 216 together comprise the detection component 212. The state detection component 214 locates a state and adds this state to the states list 246, if it has not already been processed. To keep track of the states that have and have not been processed, the state detection component 214 may keep a list of those states that have been processed and added to the states list 246. Alternatively, the state detection component 214 may refer to the states list 246 every time a state is located to determine if the state has been added or not. The state detection component 214 also adds information relating to the state into the states list 246. Information on states that have been added to the list by the state detection component 214 is provided to the transition detection component 216. The transition detection component 216 determines all of the transitions starting at the given state. These transitions are then added to the transitions list 248. The transition detection component 216 then locates all end states for each of the determined transitions. Information on these end states is provided to the state detection component 214 for processing thereby. Processing by the detection component 212 terminates when the state detection component 214 does not find any additional states to add to the states list 246.

The state modification component 218 modifies the states and the transitions in the states list 246 and the transitions list 248 in order to simplify the state machine 200. The state modification component 218 searches the states list 246 to identify any composite states in the state machines 200. Such composite states are broken up and represented by two separate states; namely, an entry state and an exit state. The composite states(s) in the states list 246 are replaced by the representational entry and exit states.

The state modification component 218 also examines the states list 246 in conjunction with the transitions list 248 to determine if there are any states in the states list 246 that do not have an entry transition in the transitions list 248. Such states are considered to be unreachable states since there is no transition leading to the state, and seemingly no way to every reach that state. For any unreachable states, the state modification component 218 adds a transition to the transitions list 248 from the initial state to the unreachable state.

After the states list 246 and the transitions list 248 have been populated with the states and transitions in the state machine 200, the parser 204 creates a tree structure 250 from the states and transitions. The parser 204 comprises a tree composition component 220 which comprises a transition mapping component 224 and a state mapping component 222. The tree composition component 220 maps events in the state machine 200 to the states in the states list 246 and the transitions in the transitions list 248. The tree component 220 first locates the events in the state machine 200. The located events are mapped to a state in the states list 246 by the state mapping component 222. The transition mapping component 224 maps the state to which the event was mapped to a transition related to the state. This iteration between the state mapping component 222 and the transition mapping component 224 continues until the tree composition component 220 determines that there are no more events to be mapped. The mapping of the events to the states and then the transitions forms the tree structure 250.

The tree structure 250 produced by the parser 204 in combination with the states list 246 and the transitions list 248 from the lexical analyzer 202 is used by the program generator 206 to produce the state machine program in the specified language (e.g. BPEL). The program generator 206 comprises a program component 226, a state process component 232 and a timeout component 252.

The program component 226 coordinates the formation of a program from the state machine 200 with the state process component 232. The program component 226 forms a basic structure that may be very similar for different state machines 200. This basic structure includes a main sequence with a start and an end (e.g. the initial state and the end state(s)) based on information in the states list 246 and the transitions list 248 as well as creation and initialization of variables to keep track of the current and next states.

The state process component 232 forms a sequence for evaluating received events and determining if and how a state should be changed. The sequence retains a general form for all current states; however, the path through this form is different for each state. Each statement within the sequence may be implemented in such a way that the different actions are implemented for each state.

The state process component 232 comprises an entry action component 230, an auto transition component 240, an exit action component 244, and an events component 238. At the beginning of the sequence formed by the state process component 232 the state is changed from the current state to the next indicated state. After this change has been implemented, the next state is unknown and the events component 238 will generate statements that wait for the next event which will provide an indication of the next state.

After the state has changed there may be entry actions that are to be performed. The entry action component 230 creates statement(s) for the entry action for the current state. As previously mentioned there may be multiple ways in which the appropriate action is chosen for the current state.

The auto transition component 240 examines the states list 246 and the transitions list 248 to determine if there is an event associated with the transitions from the current state. If there is an event associated with the transitions from the current state then this event is waited for in a subsequence created by the events component 238. If there is no event associated with the transitions from the current state then there is an automatic transition to the next state. The auto transition component 240 provides statements to determine the next state given this automatic transition and have the state changed appropriately.

Before the sequence for the current state ends and the state transitions to the next state, the current state may have exit actions that are to be performed. The exit action component 244 creates statement(s) for the exit action for the current state. As with the entry state there may be multiple ways in which the appropriate action is chosen for the current state.

The events component 238 creates a subsequence to wait for incoming events and transition states according to received event(s). The events component 238 comprises an event determination component 254, a guard component 234, and a transition component 242. The events component 238 encloses the subsequence so that this wait is performed only when the next state is unknown. Thus, if there is an automatic transition to another state so the next state has been set to a particular state, the subsequence for waiting for incoming events will not be performed.

The event determination component 254 generates statements in the subsequence that wait for an event and then determine the type of event that has been received. Based on the type of event received and the current state, one of a number of sequences may be activated (e.g. state transition, timeout, etc.). The event determination component 254 generates subsequences for each valid combination of event and state, a subsequence for the case where the state-event combination is invalid and subsequences for timeout events that are activated regardless of the state (i.e. activated for all states).

The guard component 234 provides statements to be used in conjunction with the state transitions statements set by the timeout evaluation component 256 and the transition component 242 to check that these transitions are allowed to occur. Multiple case sections are generated with guard condition statements. Each of these case sections has an associated condition corresponding to a guard condition, which, if evaluated to be true during execution, results in the transition being invoked and the next state being set. One of the case sections may be developed to handle the situation where none of the other case sections is evaluated as true. In such a final case section no transition is invoked and the next state is not set. As a result, waiting for another event continues.

The transition component 242 generates statements for determining what the current state is and what the next state should be based on the event.

The timeout component 252 generates a timer that tracks timeout conditions. When a timeout condition does occur then an event can be generated. This event can then be picked up by the subsequence waiting for events to determine how the current state is to be changed.

The code optimization component 208 analyzes the output of the program generator 206 to improve the efficiency of the resulting state machine program. The improvements may be any of a number of known changes for code optimization. For example, state transitions may be merged with guard switches to reduce the number of nodes in the state machine program.

The state machine program that results from the methods 300, 400, 500, and 600 has a generally linear structure. The basic form for the state machine program includes sections for: initialization, state transition, entry actions, event waiting and exit actions.

The general form of the state machine program may be a sequence of nested 'while' loops with any actions into, out of and during a state represented. A main while loop may be provided so that the state machine program continues executing as long as the next state is not a final state.

The initialization sequence of the state machine program creates and initializes variables for keeping track of the current state, the next state and the next transition. During initialization, the current state variable is set to the initial state of the state machines as indicated in the states list.

The processing associated with a state may be located within the main loop as a sequence. This forms a sequence of statements that remain the same regardless of the state. The current state changes at the beginning of this sequence to the next state. Thus, if the current state was the initial state, then the current state changes to the next state after entering this sequence. At the end of this sequence the next state has been determined and the sequence begins again, the beginning of which involves changing the current state to the next state. Alternatively, the transition from the current state may occur at the end or in the middle of the sequence.

Any entry actions for the current state are executed. Any automatic transitions associated with the current state are also implemented. If an automatic transition is to be performed then the variable tracking the next state is updated to indicate the next state identified in the automatic transition. If there is no automatic transition then the state requires an event to change and the next state is unknown.

If there is no automatic transition then a loop is entered which will be exited once the next valid event for the current state is received. Such a valid event can be an input (or some other similar event), which is valid for the current state, or a timeout, which is valid for all states. When an event is received there are subsequences provided for each type of event, including each timeout. Each of these subsequences for each event may include a determination of whether the current state is valid given the event. For those state-event combinations that are not valid an error message may be provided and the state machine program may either terminate or continue waiting for another event. For valid state-event combinations a guard statement that evaluates the transitions that leave from the current state is executed. The result of the guard statement is used to determine whether one of those transitions is to be used to set the next state or whether there will be no state change. If there is no state change then the waiting for an event continues.

If a timeout event occurs then the next state is set according to the timeout.

After an event has been processed, the exit action (if any) for the current state is executed. After the exit action, a transition action associated with the transition to the next state is executed.

The whole outer loop is executed until the next state is a final state in the case where the state is changed at the beginning or until the current state is a final state in the case where the state is changed at the end.

The state machine program may be implemented entirely BPEL or a combination of BPEL with Java or some other language. Any limitations presented would be a result of a particular type of operating system, or data processing system and would not be a limitation of the embodiments described herein.

The state machine program may be implemented as a computer program product for use with a computer system. The state machine program may exist as an executable computer program or may be a module in an executable computer program. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product).

It is apparent to one skilled in the art that numerous modifications and departures from the specific embodiments described herein may be made without departing from the spirit and scope of the invention.

The invention claimed is:

1. A computer-implemented method of translating a state machine into an executable state machine program, the method comprising:
   determining states and transitions in a state machine;
   generating a first structure representing the state machine by associating events in the state machine with the determined states and transitions;
   generating an executable state machine program having a second structure that operates in non-final states; and
   generating statements within the second structure for detecting an event, evaluating the detected event based on a current state to identify if the current state is valid for the detected event, and determining a next state if the current state is valid; and wherein the step of generating a first structure comprises:
   determining all events in the state machine;
   correlating the events with states in the state machine; and
   correlating the event correlated states with transitions in the state machine to form the first structure.

2. The method of claim 1 wherein the first structure is a tree structure.

3. The method of claim 2 wherein the determining comprises:
   merging an initial state into a states list;
   identifying transitions from the state merged into the states list;
   merging the identified transitions into a transitions list;
   merging end states of the identified transitions into the states list; and
   repeating identifying transitions, merging the identified transitions, and merging end states of the identified transitions until the end states are final states of the state machine.

4. The method of claim 3 further comprising:
   locating composite states in the states list; and
   replacing the located composite states with a composite entry state and a composite end state in the states list.

5. The method of claim 3 further comprising:
   locating unreachable states based on the states list and the transitions list; and
   creating a transition from the initial state to the located unreachable states in the transitions list.

6. The method of claim 1 wherein the generating an executable state machine program comprises:
   generating a basic form for the executable state machine program; and
   generating the second structure where the second structure is a loop that operates for non-final states.

7. The method of claim 1 wherein the generating statements within the second structure comprises:
   generating an iterative structure within the second structure to perform the detecting and evaluating until either the detected event is valid for the current state or an error occurs.

8. The method of claim 7 wherein the determining the next state is performed at an end of the second structure, wherein the generating statements within the second structure further comprises:
   generating a statement within the second structure to transition the current state to the next state prior to the iterative structure being performed, and wherein the second structure operates until the next state is one of the final states.

9. The method of claim 7 wherein the determining the next state is performed at an end of the second structure, wherein the generating statements within the second structure further comprises:
   generating a statement within the second structure to transition the current state to the next state after the iterative structure is performed, and wherein the second structure is configured to operate until the current state is one of the final states.

10. The method of claim 1 wherein the generating statements within the second structure includes generating statements within the second structure for performing an entry action for the current state upon transitioning into the current state and performing an exit action for the current state prior to transitioning to the next state.

11. The method of claim 1 further comprising:
    generating a timer to identify timeout conditions and generate an event for the identified timeout conditions.

12. A computer readable storage medium having stored thereon computer-executable instructions for executing an executable state machine program, said instructions having been generated by implementing the method of claims 1.

13. A computer program product comprising a computer readable storage medium having a computer readable program embodied in said medium, the computer readable program having been generated by implementing the method of claim 1 whereby, when executed on a computer, causes said computer to operate as a state machine having states, transitions and events.

14. A method of translating a state machine into an executable state machine program comprising:
    determining states and transitions in a state machine;
    generating a first structure representing the state machine by associating events in the state machine with the determined states and transitions; and
    generating an executable state machine program having a second structure that operates in non-final states wherein during execution the second structure performs detecting an event, evaluating the detected event based on a current state to identify if the current state is valid for the detected event, and transitioning the current state to a next state; and wherein the step of generating a first structure comprises:
    determining all events in the state machine;
    correlating the events with states in the state machine; and
    correlating the event correlated states with transitions in the state machine to form the first structure.

15. The method of claim 14 wherein the first structure is a tree structure.

16. The method of claim 14 wherein the determining comprises:
    merging an initial state into a states list;
    identifying transitions from the state merged into the states list;

merging the identified transitions into a transitions list;
merging end states of the identified transitions into the states list; and
repeating the identifying transitions, merging the identified transitions, and merging the end states of the identified transitions until the end states are final states of the state machine.

17. The method of claim 14 further comprising:
generating an iterative structure within the second structure to perform the detecting evaluating and transitioning until either the detected event is valid for the current state or an error occurs.

18. The method of claim 17 wherein the transitioning is performed prior to the iterative structure and wherein the second structure operates until the next state is one of the final states.

19. The method of claim 17 wherein the transitioning is performed after the iterative structure is performed and wherein the second structure is configured to operate until the current state is one of the final states.

20. The method of claim 14 further comprising:
generating statements within the second structure for performing an entry action for the current state upon transitioning into the current state and performing an exit action for the current state prior to transitioning to the next state.

21. The method of claim 14 further comprising:
generating a timer to identify timeout conditions and generate an event for the identified timeout conditions.

22. A method of generating an executable state machine program from a state machine, the state machine having states, transitions and events, said method comprising:
determining states and transitions in a state machine;
associating events in the state machine with the determined states and transitions;
generating a basic structure for an executable state machine program, the basic structure having therein a structure that operates in non-final states;
generating a statement within the structure for detecting an event;
generating a statement within the structure for evaluating the detected event based on a current state to identify if the current state is valid for the detected event;
generating a statement within the structure for determining a next state if the current state is valid; and
generating a statement within the structure for transitioning the current state to the next state; and wherein the step of generating a first structure comprises:
determining all events in the state machine;
correlating the events with states in the state machine; and
correlating the event correlated states with transitions in the state machine to form the first structure.

23. The method of claim 22 further comprising:
generating an iterative structure within the structure to enclose the statement for detecting an event, the statement for evaluating the detected event and the statement for determining the next state to perform these statements until either the detected event is valid for the current state or an error occurs.

24. The method of claim 23 wherein the statement for determining the next state is performed at the end of the structure, and wherein the statement for transitioning is performed prior to the iterative structure and the structure operates until the next state is one of the final states.

25. The method of claim 23 wherein the statement for determining the next state is performed at the end of the structure, and wherein the statement for transitioning is performed after the iterative structure is performed and the structure operates until the current state is one of the final states.

26. The method of claim 22 further comprising:
generating a statement within the structure for performing an entry action for the current state upon transitioning into the current state; and
generating a statement within the structure for performing an exit action for the current state prior to transitioning to the next state.

27. The method of claim 22 further comprising:
generating a timer to identify timeout conditions and generate an event for the identified timeout conditions.

28. A system for translating a state machine into an executable state machine program comprising:
a processor configured to execute a state machine translator which includes:
a lexical analyzer for determining states and transitions in the state machine;
a parser for associating events and the determined states and transitions in the state machine; and
a program generator for generating an executable state machine program, said program generator comprising:
a state process component for generating a structure in the executable state machine program that operates in non-final states, said state process component comprising:
an events component for generating a statement within the structure for detecting an event, the events component comprising:
an event determination component for generating a statement within the structure for evaluating the detected event based on a current state to identify if the current state is valid for the detected event; and
a transition component for generating a statement within the structure for determining a next state if the current state is valid; and wherein the parser comprises:
a state mapping component for correlating events in the state machine with states in the state machine; and
a transition mapping component for correlating the event correlated states with transitions in the state machine to form the tree structure.

29. The system of claim 28 wherein the lexical analyzer comprises:
a state detection component for identifying states in the state machine and establishing a states list with the identified states; and
a transition detection component for identifying transitions from the identified states and establishing a transitions list with the identified transitions.

30. The system of claim 29 wherein the lexical analyzer further comprises:
a state modification component for replacing the composite states in the states list with a composite entry state and a composite end state, and creating a transition from the initial state to an unreachable states in the transitions list.

31. The system of claim 28 wherein the state program generator further comprises:
a program component for generating a basic form for the executable state machine program that encompasses the structure generated by the state process component.

32. The system of claim 28 wherein the state program generator further comprises a timeout component for identifying timeout conditions and generating an events for the identified timeout conditions.

33. The system of claim 28 wherein the statement for determining the next state generated by the transition component is performed at the end of the structure, wherein the state process component further generates a statement within the structure to transition the current state to the next state prior to the event being detected, and wherein the structure operates until the next state is one of the final states.

34. The system of claim 28 wherein the statement for determining the next state generated by the transition component is performed at the end of the structure, wherein the state process component further generates a statement within the structure to transition the current state to the next state after the next state being determined, and wherein the structure operates until the current state is one of the final states.

35. A computer readable storage medium having stored thereon computer executable instructions for translating a state machine into an executable state machine program, the computer-executable instructions implementing a method comprising:
   determining states and transitions in a state machine;
   associating events with the determined states and transitions in the state machine;
   generating an executable state machine program having a structure that operates in non-final states; and
   generating statements within the structure for detecting an event, evaluating the detected event based on a current state to identify if the current state is valid for the detected event, and determining a next state if the current state is valid; and a state mapping component for correlating events in the state machine with states in the state machine; and
   a transition mapping component for correlating the event correlated states with transitions in the state machine to form the tree structure.

36. The computer-executable instructions of claim 35 wherein the identifying comprises:
   determining the states and transitions in the state machine comprising:
   merging an initial state into a states list;
   identifying transitions from the state merged into the states list;
   merging the identified transitions into a transitions list;
   merging end states of the identified transitions into the states list; and
   repeating identifying transitions, merging the identified transitions, and merging end states of the identified transitions until the end states are the state machine's final states; and
   generating a tree structure representing the state machine comprising:
   determining all events in the state machine;
   correlating the events with states in the state machine; and
   correlating the event correlated states with transitions in the state machine to form the tree structure.

37. The computer-executable instructions of claim 35 wherein the generating an executable state machine program comprises:
   generating a basic form for the executable state machine program; and
   generating the structure where the structure is a loop that operates for non-final states, and wherein the generating statements within the structure comprises:
   generating an iterative structure within the structure to perform the detecting and evaluating until either the detected event is valid for the current state or an error occurs.

38. The computer-executable instructions of claim 37 wherein the determining the next state is performed at the end of the structure, and wherein the generating statements within the structure further comprises:
   generating a statement within the structure to transition the current state to the next state prior to the iterative structure being performed, and wherein the structure operates until the next state is one of the final states.

39. The computer-executable instructions of claim 37 wherein the determining the next state is performed at the end of the structure, wherein the generating statements within the structure further comprises:
   generating a statement within the structure to transition the current state to the next state after the iterative structure is performed, and wherein the structure operates until the current state is one of the final states.

40. The computer-executable instructions of claim 35 further comprising:
   generating a timer to identify timeout conditions and generate an event for the identified timeout conditions.

41. A computer readable storage medium having stored thereon computer-executable instructions for translating a state machine into an executable state machine program the computer-executable instructions implementing a method comprising:
   determining states and transitions in a state machine;
   associating the determined states and transitions with events in a state machine;
   generating the executable state machine program having a structure that operates in non-final states, wherein during execution the structure is configured to perform detecting an event, evaluating the detected event based on a current state to identify if the current state is valid for the detected event, and transitioning the current state to a next state; wherein generating the executable state machine program comprises:
   generating a basic form for the executable state machine program; and
   generating the structure where the structure is a loop that operates for non-final states, and wherein the generating statements within the structure comprises:
   generating an iterative structure within the structure to perform the detecting and evaluating until either the detected event is valid for the current state or an error occurs.

42. The computer-executable instructions of claim 41 wherein the determining the states and transitions in the state machine comprises:
   merging an initial state into a states list;
   identifying transitions from the state merged into the states list;
   merging the identified transitions into a transitions list;
   merging end states of the identified transitions into the states list; and
   repeating identifying transitions, merging the identified transitions, and
   merging end states of the identified transitions until the end states are the state machine's final states.

43. The computer-executable instructions of claim 41 wherein the determining the next state is performed at the end of the structure, and wherein the generating statements within the structure further comprises:
   generating a statement within the structure to transition the current state to the next state prior to the iterative structure being performed, and wherein the structure operates until the next state is one of the final states.

44. The computer-executable instructions of claim 41 wherein the determining the next state is performed at the end of the structure, wherein the generating statements within the structure further comprises:
   generating a statement within the structure to transition the current state to the next state after the iterative structure is performed, and wherein the structure operates until the current state is one of the final states.

45. The computer-executable instructions of claim 41 further comprising:
   generating a timer to identify timeout conditions and generate an event for the identified timeout conditions.

46. A computer readable storage medium having stored thereon computer-executable instructions for generating an executable state machine program from a state machine, the state machine having states, transitions and events, the computer-executable instructions implementing a method comprising:
   determining states and transitions in a state machine;
   associating events in the state machine with the determined states and transitions;
   generating a basic structure for the executable state machine program, the basic structure having therein a structure that operates in non-final states;
   generating a statement within the structure for detecting an event;
   generating a statement within the structure for evaluating the detected event based on a current state to identify if the current state is valid for the detected event;
   generating a statement within the structure for determining a next state if the current state is valid; and
   generating a statement within the structure for transitioning the current state to the next state; and wherein the generating the executable state machine program comprises:
   generating a basic form for the executable state machine program; and
   generating the structure where the structure is a loop that operates for non-final states, and wherein the generating statements within the structure comprises:
      generating an iterative structure within the structure to perform detecting and
      evaluating until either the detected event is valid for the current state or an error occurs.

47. The computer-executable instructions of claim 46 wherein the determining the next state is performed at the end of the structure, and wherein the transitioning is performed prior to the iterative structure and the structure operates until the next state is one of the final states.

48. The computer-executable instructions of claim 46 wherein the determining the next state is performed at the end of the structure, and wherein the transitioning is performed after the iterative structure is performed and the structure operates until the current state is one of the final states.

49. The computer-executable instructions of claim 46 further comprising:
   generating a timer to identify timeout conditions and generate an event for the identified timeout conditions.

* * * * *